Aug. 8, 1950   J. D. RUST   2,518,187
EDGER FOR LAWN MOWERS
Filed Feb. 9, 1946   3 Sheets-Sheet 1
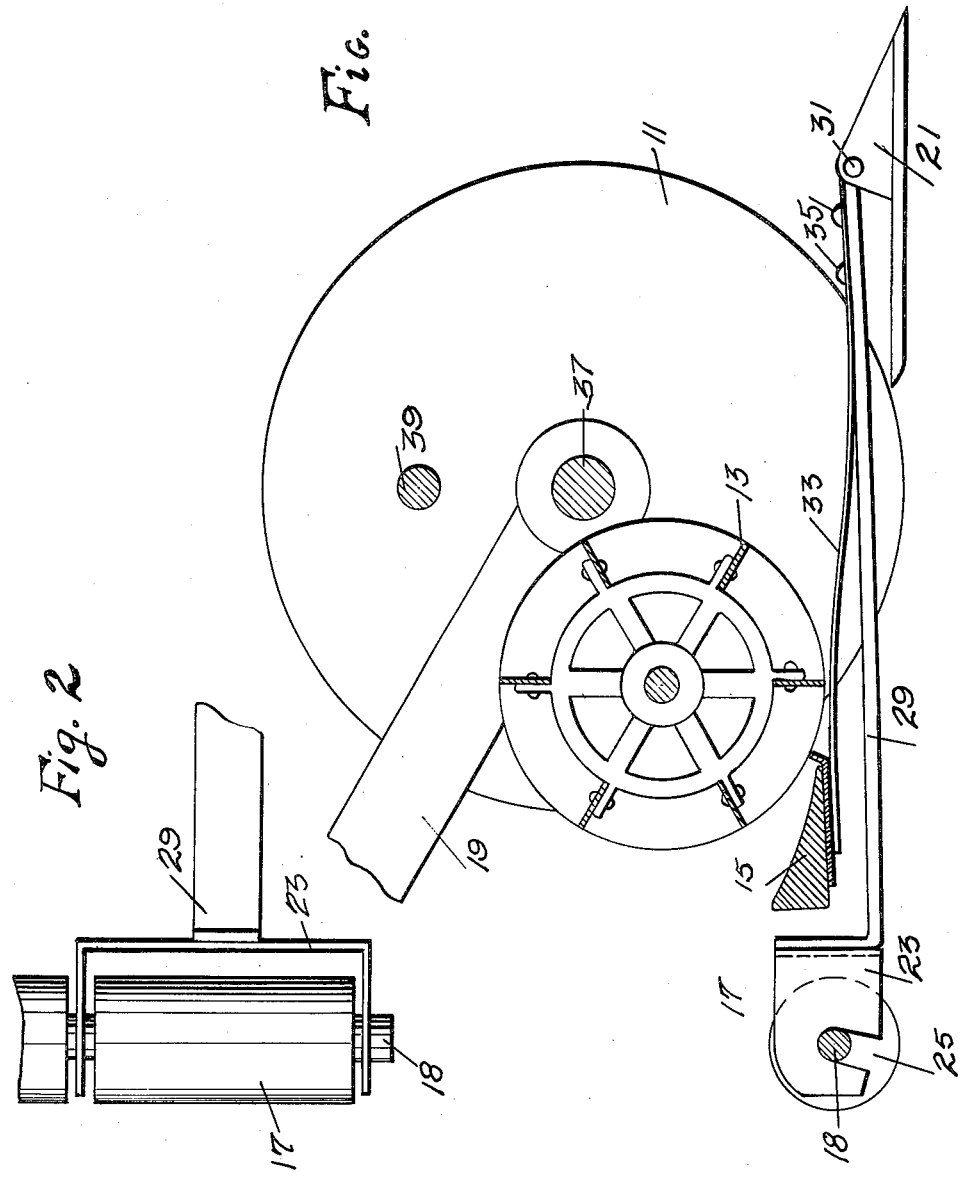
INVENTOR.
John D. Rust

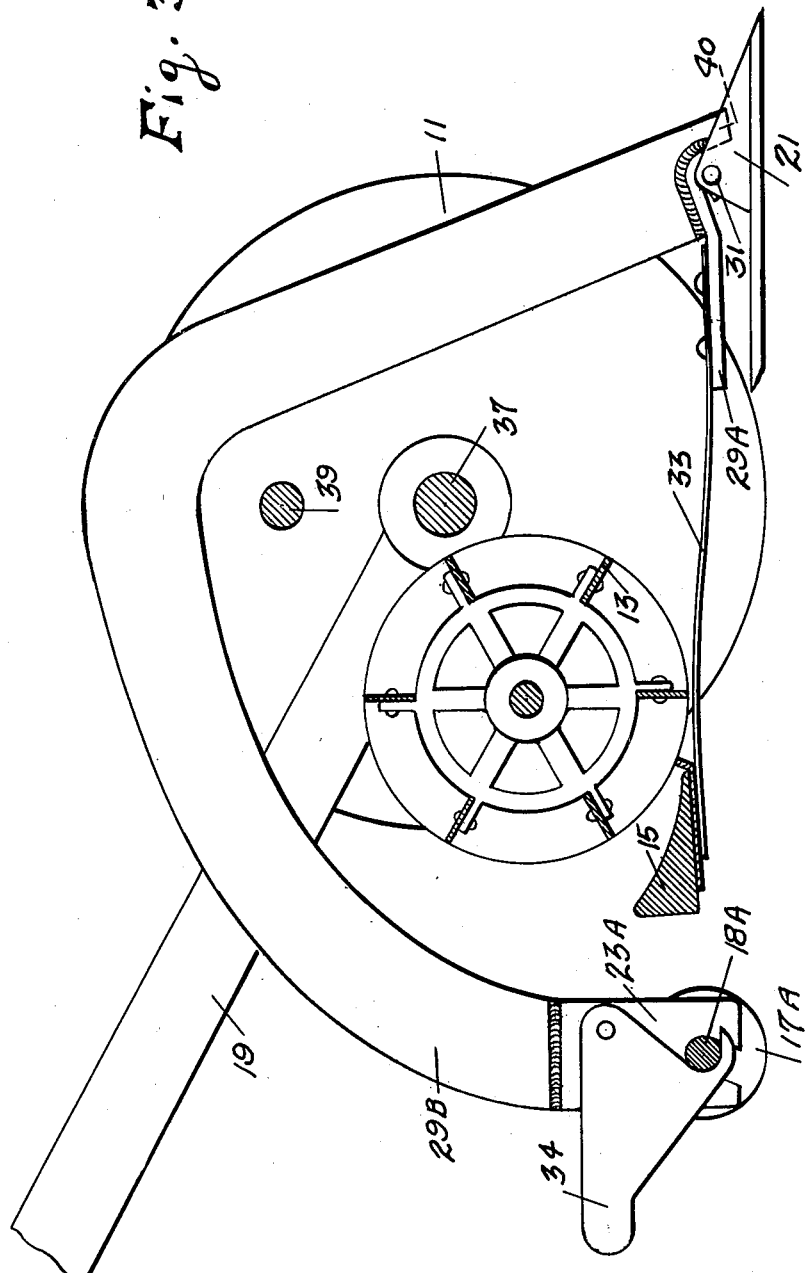

Aug. 8, 1950  J. D. RUST  2,518,187
EDGER FOR LAWN MOWERS
Filed Feb. 9, 1946  3 Sheets-Sheet 3
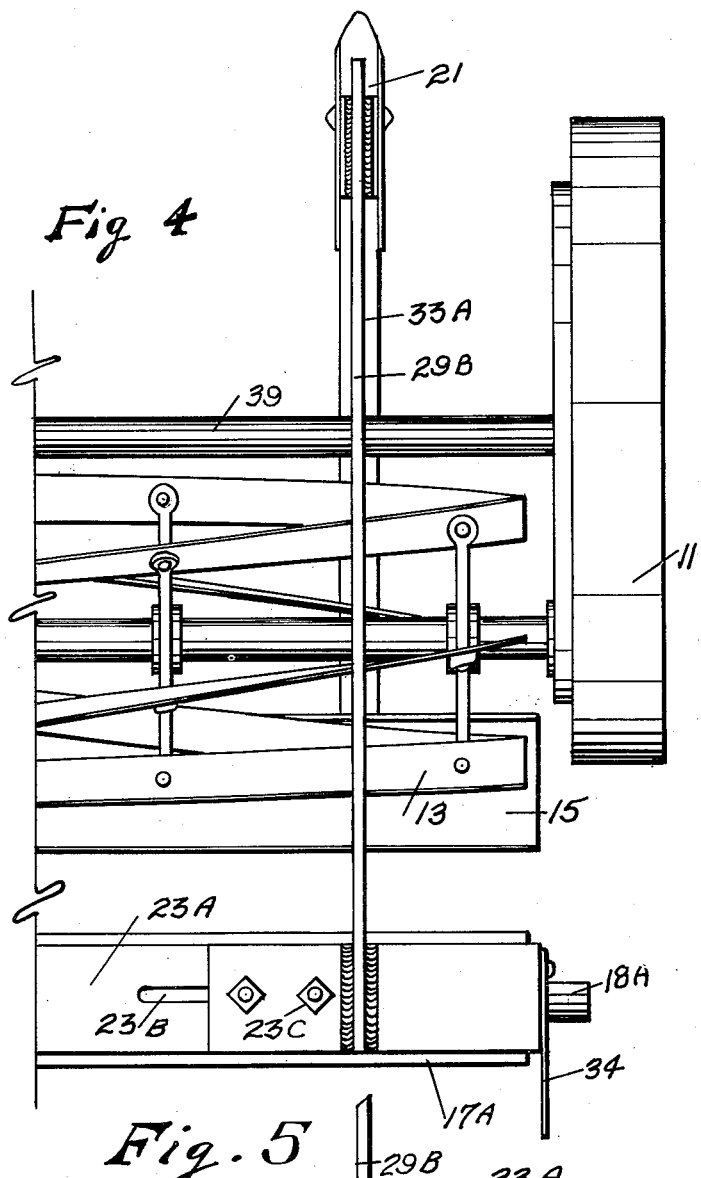
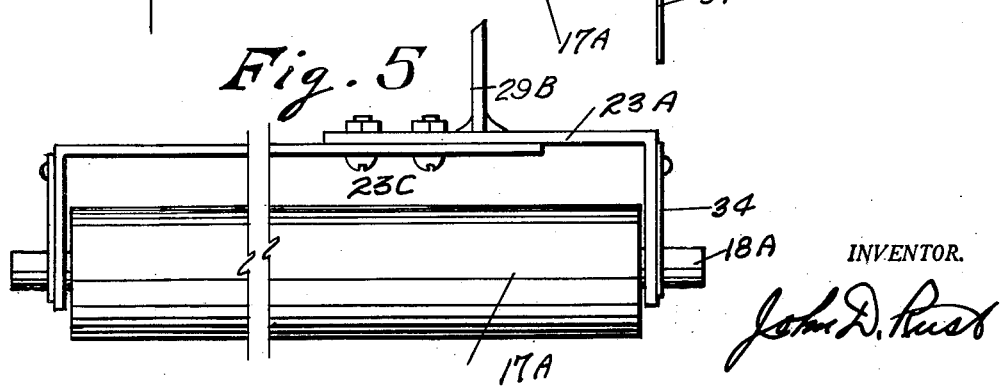
INVENTOR.
John D. Rust Patented Aug. 8, 1950

2,518,187

UNITED STATES PATENT OFFICE 2,518,187

EDGER FOR LAWN MOWERS

John D. Rust, Memphis, Tenn.

Application February 9, 1946, Serial No. 646,652

11 Claims. (Cl. 56—251)

This invention relates to means and methods for trimming the edges of lawns, especially along sidewalks, streets and the like.

In mowing lawns, it is found that the grass along the edges of the walk or driveway flattens out over the walk and that the lawn-mower simply rides over it, leaving an edge which is ragged at points where it will be most noticeable.

To obtain a neatly finished edge along the walk and at other desirable places, it has been necessary to expend a great deal of labor in trimming the flat lying or leaning grass with shears or by other hand methods which have been both tedious and tiresome.

The primary object of the present invention is:

To provide a device which can be readily attached to, or detached from, a conventional lawn-mower and which will raise the flattened or inclined grass and guide it to the cutting mechanism of the mower so that it will be cut or trimmed evenly.

A further object is to provide a device of this kind which can be attached to a standard or conventional lawn-mower without the use of tools and which, when so attached, is secure against accidental dislodgement.

A still further object is to provide an attachment for a lawn-mower which will be effective to raise and guide the grass into the cutting mechanism of the mower even though the surfaces on the carrier wheels of the mower travel may be above or below the surface on which the grass lifting device travels.

In the present application, I illustrate only one type of mower, but I want it distinctly understood that my invention resides in combining the attachment with a cutting mechanism, and it is intended to be used with any type of lawn-mower, either hand or power driven, and not to be limited as an attachment to the type illustrated.

The means by which the foregoing and other objects are accomplished, and the manner of their accomplishment, will be readily understood from the following specification upon reference to the accompanying drawings, in which:

Fig. 1 is a sectional side elevation of one form of my invention and its relation to the knives and cutter bar of the type lawn-mower illustrated herein when attached thereto.

Fig. 2 is a fragmentary plan showing the attaching end of the device and its relation to the roller of the mower to which it is attached.

Fig. 3 is a sectional side elevation of my preferred form of the device and my preferred type of attachment to the roller shaft of the mower; and Fig. 4 is a corresponding plan view of about one-half of the mower.

Fig. 5 is a rear end view of the roller and attaching fork shown in Fig. 3 and Fig. 4.

Referring now to the drawings in which the various parts are indicated by numerals:

11 is a wheel of a lawn-mower of that well known type in which spiral knives cooperate with a cutter bar, 13 are the knives, 15 the cutter bar, 17 the usual roller mounted on a transverse shaft 18, carried by the mower rearwardly of the cutter bar, and 19 the mower handle, all in usual relation, but with the frame of the mower omitted. Two types of the roller are shown. In Figs. 1 and 2, the roller comprises a number of short sections journalled on the shaft 18, leaving between the sections exposed portions of the shaft.

In Figs. 3 and 4, a single section roller 17A is shown with only the end portions of the shaft 18A accessible.

One form of the device comprises a shoe 21 adapted to ride along the surface of a driveway, walk, or the like, which shoe is carried by parts which are detachably secured to the mower and position the shoe forwardly of the mower wheels.

In Figs. 1 and 2, the carrier parts comprise a fork 23 which has side walls spaced apart to embrace a section of the roller 17, the side wall having notches 25 extending upwardly and forwardly from its lower edge for engagement over and with the shaft 18 of the roller. The fork 23 is rigidly secured, as by welding, to a bar 29 which is adapted to underlie the cutter bar 15 of the mower preventing disengagement of the fork when the device is in use, and is of length to extend forwardly of the wheels 11. At its forward end the bar 29 is pivotally connected by a pin 31 to the shoe 21, forwardly from the middle of the shoe, so that the heel is heavier than the toe of the shoe. The shoe is thus free to slide flatly on the ground or walk, and follow the contour of same.

Overlying the bar is a flat spring 33 which is secured to the bar adjacent the shoe 21, as by rivets 35, the spring extending rearwardly into underlying relation with the cutter bar 15, and normally curving upward and away from the bar 29 and at its rear end being deflected downward against such curvature by the cutter bar so that it remains in contact with the under side of the bar irrespective of how far downward the shoe 21 may drop relatively to the wheels under any ordinary condition of use.

In my preferred type of the device, shown in Figs. 3 and 4, the shoe 21, the attaching pin 31 and the spring 33 are of substantial identity with the type shown in Fig. 1, and a similar fork might have been shown had the roller used permitted. The bar 29A, however, which pivotally carries the shoe 21 is here shown as a short section to which the spring 33 is attached, and from which the spring extends as before into underlying relation with the cutter bar 15, and this section is carried by a bar 29B, arched up over the transversely extending parts, as the axle 37 and brace rod 39 of the mower, and extending downward to supporting engagement with the shaft 18A of the roller 17A. The end 40 of the arched bar preferably extends into proximity to the shaft 31 to limit pivotal movement of the shoe.

With the arched type of mounting, shown in Figs. 3 and 4, the operator is enabled to more easily overcome any obstacles that may be encountered in operation. For example, in the event that the toe of the shoe 21 encounters an obstacle, such as an offset caused by broken concrete, the operator can, by pressing down on the handle 19 of the mower, raise the shoe so that it will pass over the obstacle. The heel of the shoe being heavier than its toe will cause the toe to rise first, making it very easy to pass over any such obstacles. When the handle of the lawn-mower is pressed downward, the front of the mower is raised up, pivoting on shaft 18A of the roller 17A. At the same time the brace rod 39 raises up against the arched bar 29B and lifts the shoe 21 so that it will pass over the obstacle.

The rear end of the bar 29B is carried by fork 23A, having side walls notched for engagement with the shaft 18A of the roller 17A. In this case, the roller 17A shown, extends continuously across the mower and engagement of the fork is with opposite end portions of the shaft. The crossbar of the fork is preferably in two parts, one of which is provided with a longitudinal slot 23B, the parts being adjustably clamped together by bolts 23C. Latches 34 pivotally attached to the side walls of the fork prevent accidental disengagement of the fork and shaft.

It will readily be understood that the arched type of mounting, adjustable bar, fork and latches shown in Figs. 3 and 4, may be used for attachment on a mower having the sectional type roller 17 of Figs. 1 and 2. Likewise the type 23A of the fork may be used with the bar 29 of Figs. 1 and 2, where a long roller exists, but the latches 34 are unnecessary with a bar which underlies the cutter bar.

Attachment of the type of the device shown in Figs. 3 and 4 is made by moving the arched bar 29B into place over the mower parts with the end of the spring 33 under the cutter bar 15, lowering the fork 23A into engagement with the shaft 18A and engaging the latches 34 with the shaft.

Attachment of the type shown in Figs. 1 and 2 is made by raising the wheels 11, knives 13 and cutter bar 15 and other mower parts about the roller 17, engaging the spring 33 beneath the cutter bar 15 and the notches 25 of the fork with the shaft 18 and lowering the mower parts completing the engagement.

The mower without attachment of the device is used in ordinary manner to mow the lawn.

Where edging is to be done, the device is attached as described and the mower pushed along the edge of the drive, walk or the like over which the grass has flattened to direct the shoe 21 along the desired line of cut. The point of the shoe in such movement engages under and raises up the flattened grass and spring 33 guides the grass to the cutter bar 15, where it is cut off by the knives 13. In this movement the spring insures that there be no interruption in the path of the grass to the cutter bar, irrespective of any rise or drop of the shoe 21 relatively to the cutter bar, which might otherwise occur because of ground or other surface irregularities. After the edges are trimmed, or for any other reason, the device may be readily disconnected and removed.

It will be understood that much of the detail of the device may be changed without departing from the spirit of my invention and I wish it distinctly understood that I do not intend to limit myself to such detail except as in any claim it may be set out.

I claim:

1. An attachment for a lawn-mower having a cutter bar and cooperating knives, and having a shaft carried roller rearwardly thereof, said attachment including, in combination, mechanical means for trimming edges of lawns, said means comprising an over-arching arm pivotally anchored to the lawn-mower, a sliding shoe for raising flattened or leaning grass or weeds, said shoe being pivotally connected forwardly from its center of gravity to the forward end of said over-arching arm, and yielding means carried by said arm for guiding said grass and weeds from said shoe into the cutting mechanism of the mower.

2. An attachment for a lawn-mower having a cutter bar and cooperating knives, and a shaft-carried roller rearwardly thereof, said attachment comprising in combination a shoe, means connected to said shoe detachably engageable with said roller shaft, pivotal means on said shoe extending forwardly from said shaft-engageable means for pivotally supporting said shoe forwardly of said cutter bar and knives, and resilient guide means secured to said forwardly extending means in adjacency to said shoe and extending rearwardly therefrom into underlying contact with said cutter bar.

3. An attachment for a lawn-mower having a cutter bar and cooperating knives, and a shaft-carried roller rearwardly thereof, said attachment comprising in combination a shoe, means connected to said shoe detachably engageable with said roller shaft, pivotal means on said shoe extending forwardly from said shaft-engageable means in underlying relation to said cutter bar pivotally for supporting said shoe forwardly of said cutter bar and knives, and resilient guide means secured to said forwardly extending means rearwardly of said shoe and extending rearwardly into underlying contact with said cutter bar.

4. An attachment for a lawn-mower having a cutter bar and cooperating knives, and a shaft-carried roller rearwardly thereof, said attachment comprising, means connected to said shoe detachably engageable with said roller shaft, pivotal means on said shoe extending forwardly from said shaft-engageable means in overlying relation to said mower knives, a shoe pivotally supported by said forwardly extending means forwardly of said cutter bar and knives, and resilient guide means secured to said forwardly extending means rearwardly of said shoe and extending rearwardly into underlying contact with said cutter bar.

5. An attachment for a lawn-mower having a cutter bar and cooperating knives, and a shaft-carried roller rearwardly thereof, said attachment comprising a fork detachably engageable with said roller shaft, means carried by said fork engageable with said shaft for latching said fork thereto, means extending forwardly from said shaft-engageable means in underlying relation to said mower knives, a shoe pivotally supported by said forwardly extending means forwardly of said cutter bar and knives, and resilient guide means secured to said forwardly extending means rearwardly of said shoe and extending rearwardly into underlying contact with said cutter bar.

6. An attachment for a lawn-mower, said attachment comprising mechanical means for trimming the edges of lawns, said means comprising an over-arching arm pivotally anchored to the lawn-mower, a sliding lifting member carried by said arm for raising flattened or leaning grass or weeds and yielding means carried by said arm for guiding said grass or weeds from the sliding lifting member into the cutting mechanism of the mower.

7. An attachment for a lawn-mower, said attachment comprising mechanical means for trimming the edges of lawns, said means comprising an arm pivotally anchored to the lawn-mower, a sliding lifting member carried by said arm for raising flattened or leaning grass or weeds and yielding means carried by said arm for guiding said grass or weeds from the sliding lifting member into the cutting mechanism of the mower.

8. An attachment for a lawn-mower which mower includes a cutter bar and cooperating knives and a shaft-carried roller rearwardly thereof, said attachment comprising a bar detachably and pivotally engageable with said roller shaft and extending to a place forwardly of said cutter bar and cooperating knives, a shoe having a ground-engaging under surface, means pivotally connecting said shoe with the forward extremity of said bar at a point in advance of the mid-length of said shoe, and a leaf spring carried by the forward extremity of said bar and extended rearwardly to lie beneath and in engagement with said cutter bar.

9. An attachment for a lawn-mower having a roller with a shaft; said attachment including an over-arching arm having spaced apart elements adapted for attachment to the shaft of said roller, and a sliding shoe operatively attached to said arm for raising flattened or leaning grass or weeds.

10. An attachment according to claim 9 wherein said shoe is pivotally attached to the forward end of said arm, and wherein means are provided that are adapted for guiding the grass or weeds from said shoe into the cutting mechanism of the mower.

11. An attachment for a lawn-mower having a cutter bar, said attachment including a roller having a shaft, an arm having means adjacent one end for pivotal attachment to said roller, a sliding shoe on said attachment adapted for sliding on the ground, means pivotally connecting said shoe to said arm, and a flat spring secured to said arm adjacent said shoe and extending to adjacent said cutter bar for guiding grass and weeds from said shoe to the cutter bar.

JOHN D. RUST.

REFERENCES CITED

The following references are of record in the file of this patent:

UNITED STATES PATENTS

| Number | Name | Date |
|---|---|---|
| 510,753 | Woodyatt | Dec. 12, 1893 |
| 1,135,071 | Swanson | Apr. 13, 1915 |
| 1,501,244 | Scott | July 15, 1924 |
| 1,626,712 | Agee | May 3, 1927 |
| 1,684,886 | Rabie | Sept. 18, 1928 |
| 1,876,462 | Larson | Sept. 6, 1932 |
| 2,116,829 | Hoerner | May 10, 1938 |
| 2,157,620 | McGrath et al. | May 9, 1939 |